(12) United States Patent
Tan et al.

(10) Patent No.: US 9,903,399 B2
(45) Date of Patent: Feb. 27, 2018

(54) SIMPLE LOCKING DEVICE

(71) Applicant: GRG Banking Equipment Co., Ltd., Guangzhou, Guangdong (CN)

(72) Inventors: Jiawu Tan, Guangdong (CN); Wenqing Wu, Guangdong (CN); Zhuang Jiang, Guangdong (CN); Zhiqiang Sun, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/104,392

(22) PCT Filed: Oct. 27, 2014

(86) PCT No.: PCT/CN2014/089558
§ 371 (c)(1),
(2) Date: Jun. 14, 2016

(87) PCT Pub. No.: WO2015/169065
PCT Pub. Date: Nov. 12, 2015

(65) Prior Publication Data
US 2016/0327075 A1    Nov. 10, 2016

(30) Foreign Application Priority Data

May 6, 2014  (CN) .......................... 2014 1 0188640

(51) Int. Cl.
*F16B 1/00*    (2006.01)
*F16B 1/04*    (2006.01)
(Continued)

(52) U.S. Cl.
CPC ................ *F16B 1/04* (2013.01); *E05C 1/002* (2013.01); *E05C 1/004* (2013.01); *E05C 9/002* (2013.01)

(58) Field of Classification Search
CPC ... F16B 1/02; F16B 1/04; B60R 7/087; E05C 9/002; E05C 1/004; Y10T 292/0838;
(Continued)

(56) References Cited

U.S. PATENT DOCUMENTS

| 1,626 | A | * | 6/1840 | Roberts et al. ......... E05B 85/22 |
| | | | | 292/192 |
| 58,548 | A | * | 10/1866 | Kast .................... E05B 65/5238 |
| | | | | 292/156 |

(Continued)

FOREIGN PATENT DOCUMENTS

| CN | 101012711 A | 8/2007 |
| CN | 201162743 Y | 12/2008 |

(Continued)

OTHER PUBLICATIONS

International Search Report for PCT/CN2014/089558, dated Jan. 18, 2015, ISA/CN.

(Continued)

*Primary Examiner* — Michael P Ferguson
*Assistant Examiner* — Matthew R McMahon
(74) *Attorney, Agent, or Firm* — U.S. Fairsky LLP; Yue Xu

(57) ABSTRACT

A simple locking device includes a locking bracket, a locking tongue piece, a tension spring, a tension side wall, a base, at least two guide shafts, connection components and, wherein the locking bracket includes a lock piece, at least two guide holes and a retaining piece; the tension side wall is fixed to the base; and the at least two guide shafts respectively pass through the at least two guide holes to mount the locking bracket onto the base, such that the locking bracket is guided by the guide holes to move.

11 Claims, 7 Drawing Sheets

(51) Int. Cl.
*E05C 1/00* (2006.01)
*E05C 9/00* (2006.01)

(58) Field of Classification Search
CPC ......... Y10T 292/0845; Y10T 292/0924; Y10T 292/0933; Y10T 292/0956; Y10T 292/0961; Y10T 292/0968; Y10T 292/1037; Y10S 292/11; Y10S 292/63; H05K 7/1425
USPC .......................................... 361/759, 801, 803
See application file for complete search history.

(56) References Cited

U.S. PATENT DOCUMENTS

| | | | | |
|---|---|---|---|---|
| 1,037,662 | A * | 9/1912 | Roberts et al. | ........... E05B 5/00 292/162 |
| 1,192,105 | A * | 7/1916 | Patterson | ............ E05B 65/0811 292/100 |
| 1,349,032 | A | 8/1920 | Windsor | |
| 1,987,076 | A * | 1/1935 | Pulis | ..................... E04G 17/045 249/219.1 |
| 2,698,762 | A * | 1/1955 | Dall | ........................ E05B 83/24 292/127 |
| 3,773,252 | A * | 11/1973 | Jensen | ....................... G07F 9/06 232/1 R |
| 4,174,508 | A | 11/1979 | Lichtenberger | |
| 5,113,676 | A * | 5/1992 | Panossian | ............... E05B 55/12 292/18 |
| 5,675,475 | A * | 10/1997 | Mazura | ................ H05K 7/1409 361/754 |
| 6,556,450 | B1 * | 4/2003 | Rasmussen | ............. G07F 17/32 361/754 |
| 6,688,656 | B1 * | 2/2004 | Becken | ............... E05B 65/0858 292/26 |
| 6,820,905 | B1 * | 11/2004 | Haeck | ................ E05B 65/1013 292/223 |
| 6,967,847 | B2 * | 11/2005 | Barsun | .................... G06F 1/184 361/725 |
| 7,027,309 | B2 * | 4/2006 | Franz | ............... H01R 13/62933 361/732 |
| 7,284,997 | B2 * | 10/2007 | Joist | ..................... H05K 7/1409 439/157 |
| 7,292,457 | B2 * | 11/2007 | DeNies | ................ H05K 7/1461 361/759 |
| 7,712,799 | B2 * | 5/2010 | Peng | ..................... E05B 65/1013 292/137 |
| 8,077,473 | B1 * | 12/2011 | Lewis | .................. H05K 7/1409 361/754 |
| 8,177,264 | B2 * | 5/2012 | Iwakami | ............... B63B 25/002 292/36 |
| 8,226,131 | B1 * | 7/2012 | Bruce | ..................... E05C 9/002 292/137 |
| 8,342,580 | B2 * | 1/2013 | Cowie | .................... B65D 19/08 292/104 |
| 8,353,549 | B2 * | 1/2013 | Buchheit | ................ E05B 83/30 292/33 |
| 8,899,635 | B2 * | 12/2014 | Nakanishi | ........... E05B 63/0056 292/194 |
| 8,976,536 | B2 * | 3/2015 | French, Jr. | ........... H05K 7/1427 16/221 |

FOREIGN PATENT DOCUMENTS

| | | | | |
|---|---|---|---|---|
| CN | 201277224 | Y | 7/2009 | |
| CN | 102287424 | A | 12/2011 | |
| CN | 102444649 | A | 5/2012 | |
| CN | 102536976 | A | 7/2012 | |
| CN | 103149981 | A | 6/2013 | |
| CN | 103511408 | A | 1/2014 | |
| CN | 103939431 | A | 7/2014 | |
| DE | 2912881 | A1 * | 10/1980 | ............ E05B 63/06 |
| DE | 8815810 | U1 | 2/1989 | |
| EP | 3276761 | A2 | 1/1988 | |
| GB | 300617 | A | 2/1930 | |
| GB | 1154671 | A | 6/1969 | |
| JP | 2005069452 | A | 3/2005 | |

OTHER PUBLICATIONS

European Search Report for 14891430.2-1760/3141765, dated Feb. 23, 2017.

* cited by examiner

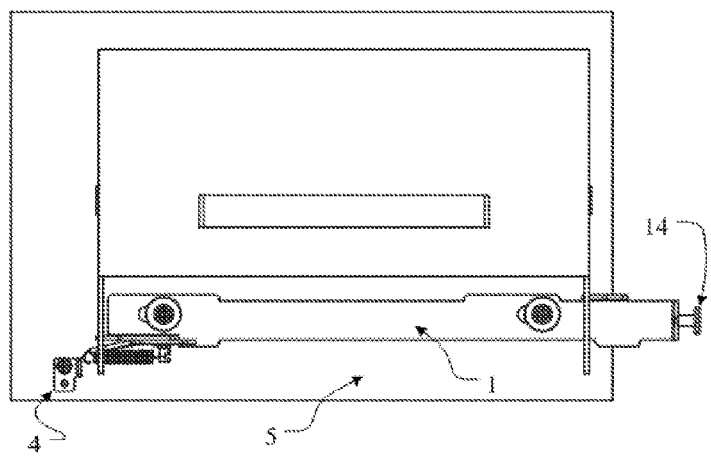
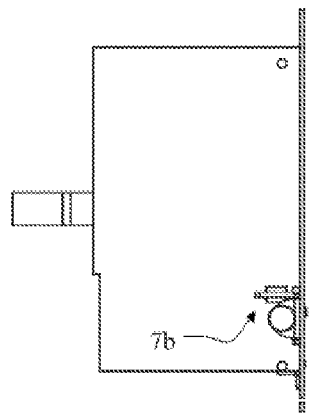
Fig. 3a          Fig. 3b
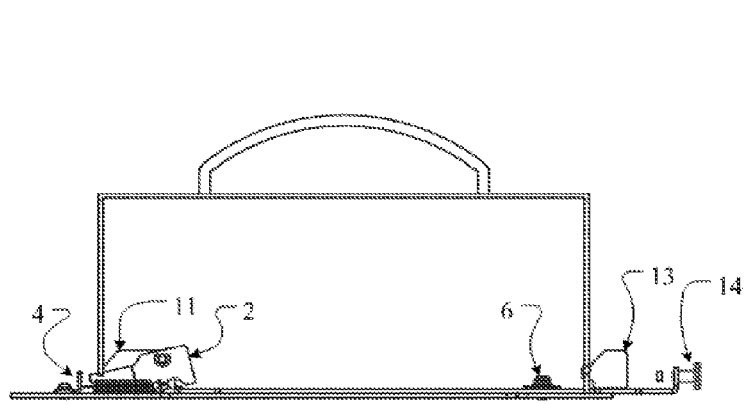
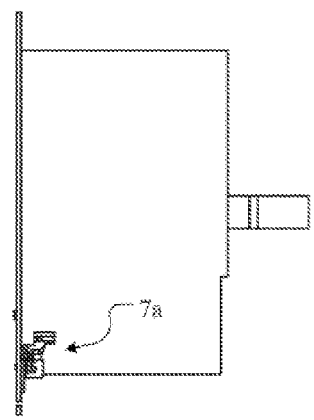
Fig. 3c          Fig. 3d

SIMPLE LOCKING DEVICE

This application is the national phase of International Application No. PCT/CN2014/089558, titled "SIMPLE LOCKING DEVICE", filed on Oct. 27, 2014, which claims the benefit of priority to Chinese Patent Application No. CN201410188640.X titled "SIMPLE LOCKING DEVICE", filed with the Chinese State Intellectual Property Office on May 6, 2014, the entire disclosures of both applications are incorporated herein by reference.

FIELD

The present application relates to the field of mechanical apparatus, and particularly to a simple locking device.

BACKGROUND

With the development and progress of the society, movable devices play an extremely important role in people's daily life, and people's dependency upon the movable devices has been increasingly high. In many occasions, people need to position and lock the movable devices.

In the conventional locking devices, for locking the movable device, generally, multiple locking components (such as a handle catch, a rotary lock or a movable pin lock), each having a single capability, are adopted to lock the movable device.

However, generally, this kind of locking device can only achieve mechanical unlocking and locking by a single action, or achieve one function by multiple mechanisms and/or multiple actions, and cannot perform actions in multiple states by a single mechanism to achieve the locking function in various states, therefore, the operation is troublesome.

SUMMARY

A simple locking device is provided according to the present application, which can perform actions in multiple states by a single mechanism to lock up a movable device, thereby making the operation to be easier and more convenient and facilitating improving the user experience.

A simple locking device according to embodiments of the present application, includes a locking bracket, a locking tongue piece, a tension spring, a tension side wall, a base, at least two guide shafts, a first connecting component and a second connecting component. The locking bracket includes a locking piece, at least two guide holes and a retaining piece. The tension side wall is fixed to the base. The at least two guide shafts respectively pass through the at least two guide holes to mount the locking bracket to the base, and the locking bracket configured to be guided by the guide holes to move. The tension spring has one end fixed to the tension side wall, and another end fixedly connected to the locking tongue piece. The locking tongue piece is movably connected to the locking piece, the locking tongue piece is provided with a front-end extending portion, and the locking piece is provided with an inclined protruding portion. The first connecting component is provided with a groove position configured to cooperate with the inclined protruding portion of the locking piece, and an extending portion configured to cooperate with the front-end extending portion of the locking tongue piece. The second connecting component is provided with a retaining hole configured to cooperate with the retaining piece.

Optionally, the locking tongue piece further includes a spring hooking position, and the spring hooking position is arranged at a side surface of the locking tongue piece, and is fixedly connected to the tension spring; and the locking bracket further includes a handle position, and the handle position is arranged at an end of the locking bracket close to the retaining piece, and is configured to provide a force applying point for pulling the locking bracket.

Optionally, the first connecting component and the second connecting component are configured to be mounted to a same movable device; and/or, the first connecting component and the second connecting component are configured to be arranged on a same movable device.

Optionally, the first connecting component and the second connecting component are respectively configured to be located on the movable device symmetrically.

Optionally, the simple locking device further includes a pin shaft, and the pin shaft is configured to allow the locking tongue piece to be movably connected to the locking piece.

Optionally, in the case that the inclined protruding portion of the locking piece is clamped into the groove position of the first connecting component, the extending portion of the first connecting component presses the front-end extending portion of the locking tongue piece downwards and abuts against the front-end extending portion of the locking tongue piece, and the retaining piece is retained into the retaining hole of the second connecting component.

Optionally, in the case that the front-end extending portion of the locking tongue piece abuts against a side surface of the extending portion of the first connecting component, the tension spring is in a tensioned state, and the locking bracket is guided by the guide holes to move by a certain distance in a direction away from the tension side wall, and the inclined protruding portion of the locking piece is disengaged from the groove position of the first connecting component, and the retaining piece is disengaged from the retaining hole of the second connecting component.

Optionally, the guide holes have the same guide directions.

Optionally, the guide shafts are bolts; or, the guide shafts are protruding shafts arranged on the base.

Optionally, the tension side wall is welded to the base; or, the tension side wall is fixed to the base by a bolt.

As described in the above technical solutions, the present application has the following advantages.

In the present application, a simple locking device includes a locking bracket, a locking tongue piece, a tension spring, a tension side wall, a base, at least two guide shafts, and a first connecting component and a second connecting component. The locking bracket includes a locking piece, at least two guide holes and a retaining piece. The tension side wall is fixed to the base. The at least two guide shafts respectively pass through the at least two guide holes, to mount the locking bracket to the base, and the movement of the locking bracket is guided by the guide holes. The tension spring has one end fixed to the tension side wall, and another end fixedly connect to the locking tongue piece. The locking tongue piece is movably connected to the locking piece. The locking tongue piece is provided with a front-end extending portion at its front end, the locking piece is provided with an inclined protruding portion, and the first connecting component is provided with a groove position configured to cooperate with the inclined protruding portion of the locking piece, and an extending portion configured to cooperate with the front-end extending portion of the locking tongue piece. The second connecting component is provided with a retaining hole configured to cooperate with the retaining piece. In this embodiment of the present application, the locking bracket, the locking tongue piece, the tension spring, the tension side wall, the base, the at least two guide shafts, the first connecting component and the second connecting component constitute a locking mechanism, which may perform actions in multiple states by a single mechanism, and no longer just performs the mechanical unlocking and locking by a single action, but can lock the movable device connected to the first connecting component and the connecting component 7b in different states, thus, the operation becomes easier and more convenient, and the improvement of the user experience is facilitated.

BRIEF DESCRIPTION OF THE DRAWINGS

FIG. 2 is a schematic view showing the structure of a locking bracket according to the present application, wherein.

FIG. 3 is a schematic view showing the structure of the simple locking device according to the embodiment of the present application, with a movable device being locked to the simple locking device, wherein, FIG. 3a is a top view of the simple locking device, FIG. 3b is a right view of the simple locking device, FIG. 3c is a front view of the simple locking device, and FIG. 3d is a left view of the simple locking device;

FIG. 4 is a schematic view showing the structure of a locking tongue piece according to the embodiment of the present application, wherein.

FIG. 5 is a schematic view showing the structure of a base according to the embodiment of the present application, wherein.

FIG. 7b is an enlarged view of portion A in FIG. 7a; and FIG. 8 is schematic view showing the structure of a simple locking device being operated to switch between an initial state, a locked state, and an unlocked state, according to the embodiment of the present application, wherein.

DETAILED DESCRIPTION

A simple locking device is provided according to an embodiment of the present application, which is configured to perform actions in multiple states by a single mechanism to lock the movable device, thereby making the operation to be easier and more convenient, and facilitating improving the user experience.

For making the objects, features and advantages of the present application clearer and easier to be understood, the technical solutions according to the present application are described clearly and completely hereinafter in conjunction with the drawings in the embodiments of the present application. Apparently, the embodiments described hereinafter are only a part of the embodiments of the present application, rather than all embodiments. Based on the embodiments in the present application, all of other embodiments, made by the person skilled in the art without any creative efforts, fall into the scope of the present application.

Figure 1:
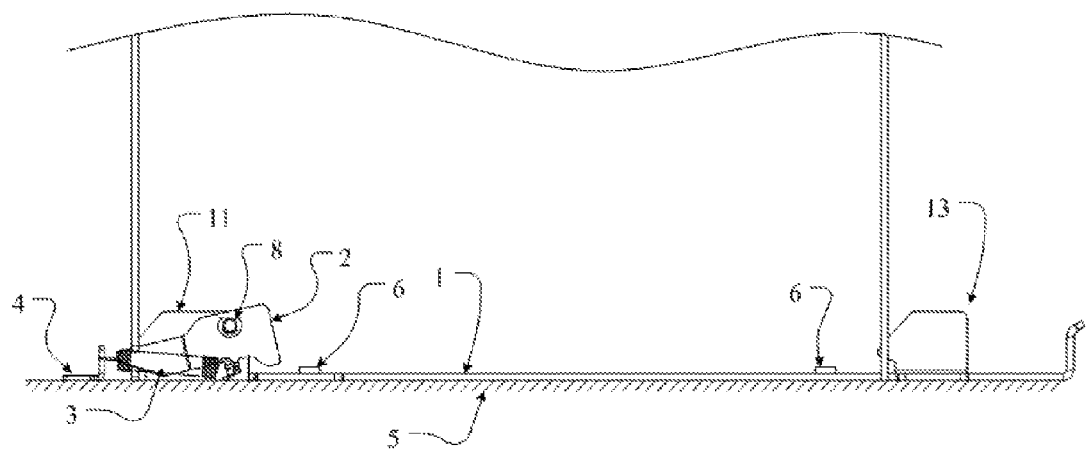
FIG. 1 is a schematic view showing the structure of an embodiment of a simple locking device according to the present application.

Referring to FIGS. 1 to 8, an embodiment of a simple locking device according to the present application includes a locking bracket 1, a locking tongue piece 2, a tension spring 3, a tension side wall 4, a base 5, at least two guide shafts 6, a connecting component 7a and a connecting component 7b, as shown in FIG. 1.

Figure 2A:
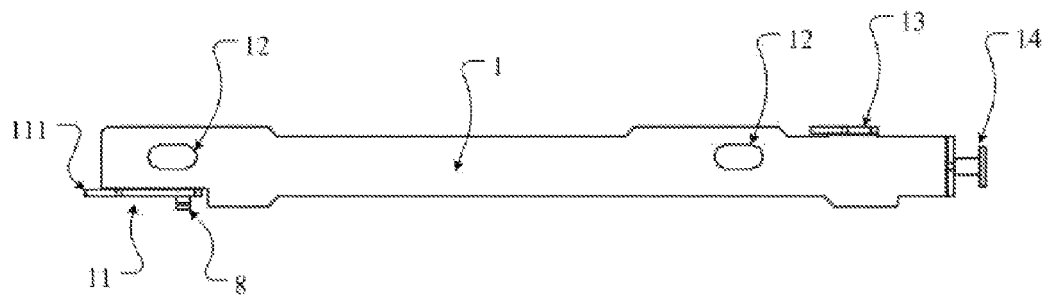
FIG. 2a is a top view of the locking bracket.
Figure 2B:
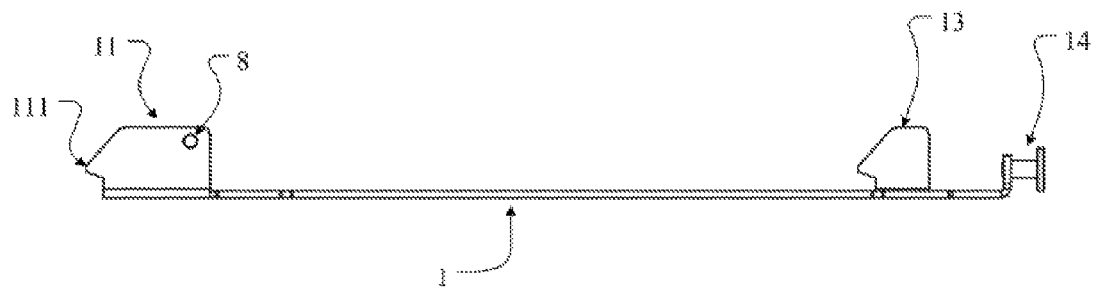
FIG. 2b is a front view of the locking bracket.

Reference is made to FIG. 2, FIG. 2a is a top view of the locking bracket 1, and FIG. 2b is a front view of the locking bracket 1. The locking bracket 1 includes a locking piece 11, at least two guide holes 12, and a retaining piece 13. The guide holes 12 have the same guide directions. The structure of the locking piece 11 may be referred to FIG. 2. As illustrated in FIG. 2, the locking piece 11 may be a hard sheet perpendicular to a plane where the guide holes 12 are located, and a front end of the locking piece 11 is provided with an inclined protruding portion 111, and the inclined protruding portion 111 may cooperate with a groove position 71 of the connecting component 7a to achieve the locking function. The specific operation process is described hereinafter. As illustrated in FIG. 2, the locking piece 11 is arranged at a left end of the locking bracket 1, the retaining piece 13 is arranged at a right end of the locking bracket 1, and the retaining piece 13 can be retained in a retaining hole 73 in the connecting component 7b, to lock the connecting component 7b. The locking bracket 1 may further be provided with a handle position 14, and the handle position 14 is arranged at an end, close to the retaining piece 13, of the locking bracket 1, and is configured to provide a force applying point for pulling the locking bracket 1.

FIG. 3 is a schematic view showing the structure of the simple locking device according to the embodiment of the present application, with a movable device being locked to the simple locking device, wherein, FIG. 3a is a top view of the simple locking device, FIG. 3b is a right view of the simple locking device, FIG. 3c is a front view of the simple locking device, and FIG. 3d is a left view of the simple locking device.

Figure 4A:
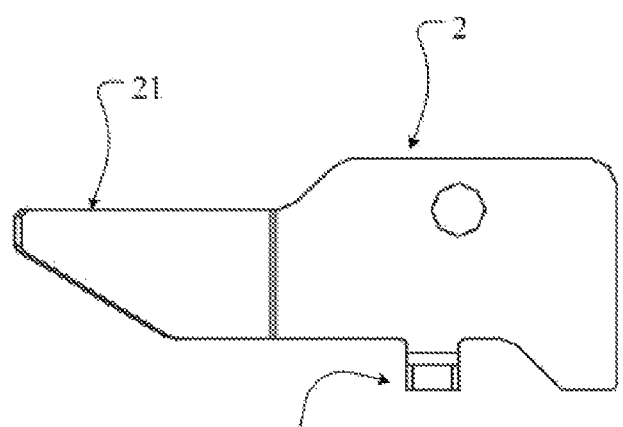
FIG. 4a is a front view of the locking tongue piece.
Figure 4B:
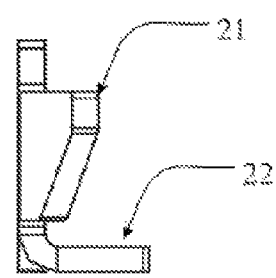
FIG. 4b is a side view of the locking tongue piece.
Figure 4C:
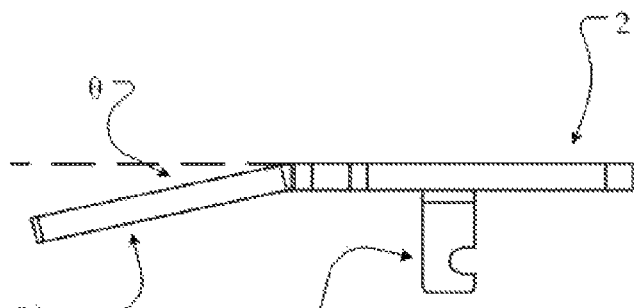
FIG. 4c is a top view of the locking tongue piece.

Reference is made to FIG. 4, FIG. 4a is a front view of the locking tongue piece 2, FIG. 4b is a side view of the locking tongue piece 2, and FIG. 4c is a top view of the locking tongue piece 2. The locking tongue piece 2 may be a hard sheet, and the locking tongue piece 2 is provided with a front-end extending portion 21 at its front end. For better cooperating with an extending portion 72 of the connecting component 7a, the front-end extending portion 21 of the locking tongue piece 2 is arranged at a small angle θ with respect to a main body of the locking tongue piece 2, thus, after the locking tongue piece 2 and the locking piece 11 are movably connected via a pin shaft 8, an angle θ is also formed between the front-end extending portion 21 and the inclined protruding portion 111, and thus the front-end extending portion 21 and the inclined protruding portion 111 will not interfere with each other when the front-end extending portion 21 and the inclined protruding portion 111 respectively engage with the connecting component 7a, and the specific operation process will be described hereinafter. The locking tongue piece 2 may further include a spring hooking position 22, and the spring hooking position 22 is arranged at a side surface of the locking tongue piece 2, and is fixedly connected to the tension spring 3.

Figure 5A:
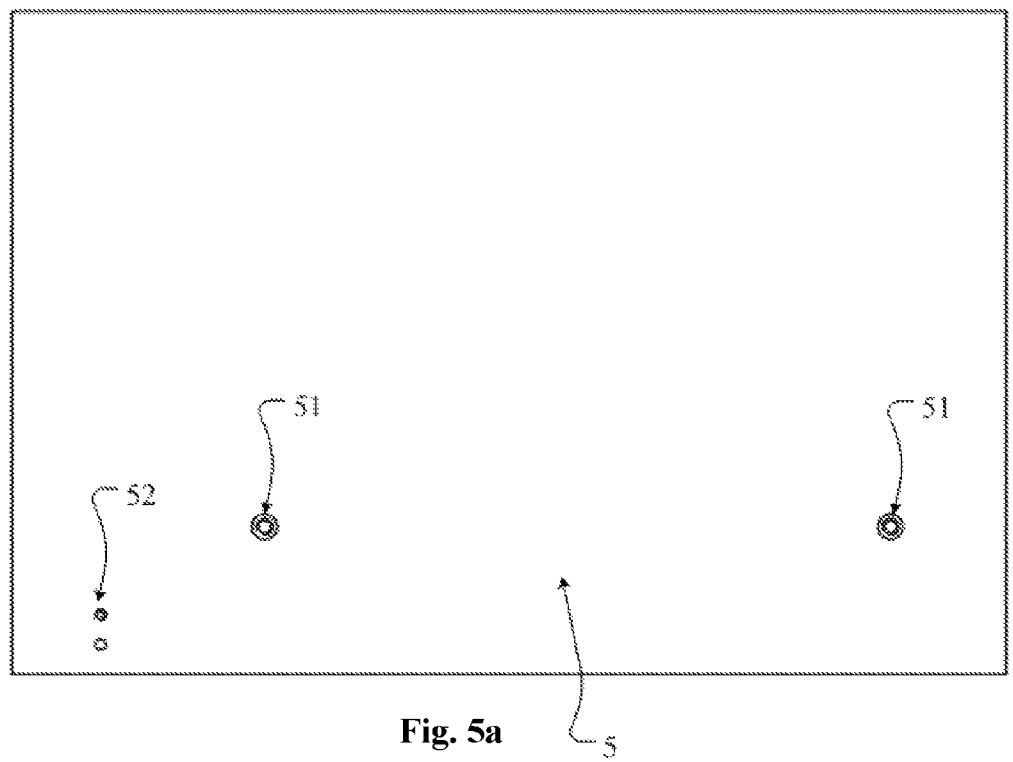
FIG. 5a is a top view of the base 5.
Figure 5B:
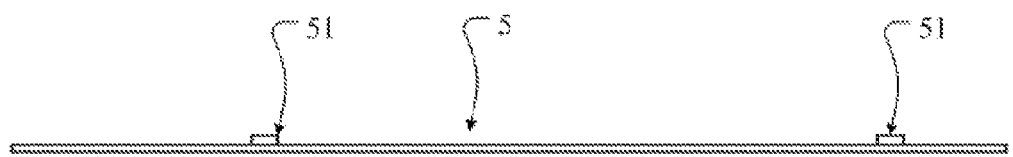
FIG. 5b is a front view of the base 5.

Reference is made to FIG. 5, FIG. 5a is a top view of the base 5, and FIG. 5b is a front view of the base 5. The base 5 may be a flat plate, and the material of the base 5 and the position for fixing the base 5 may be adjusted according to practical situations, which are not limited specifically. The base 5 is provided with at least two mounting holes or at least two protruding shafts 51. In the case that the guide shafts 6 are embodied as the protruding shafts 51, at least two protruding shafts 51 are provided on the base 5; and in the case that the guide shafts 6 are embodied as bolts, at least two mounting holes are provided in the base 5. The base 5 may be further provided with two mounting holes 52, and in the case that the tension side wall 4 is fixed to the base 5 via screws, the mounting holes 52 are configured to cooperate with the screws to fix the tension side wall 4 to the base 5. FIG. 5 shows a front view and a top view of the base 5 in the case that the guide shafts 6 are embodied as the protruding shafts 51.

Figure 6:
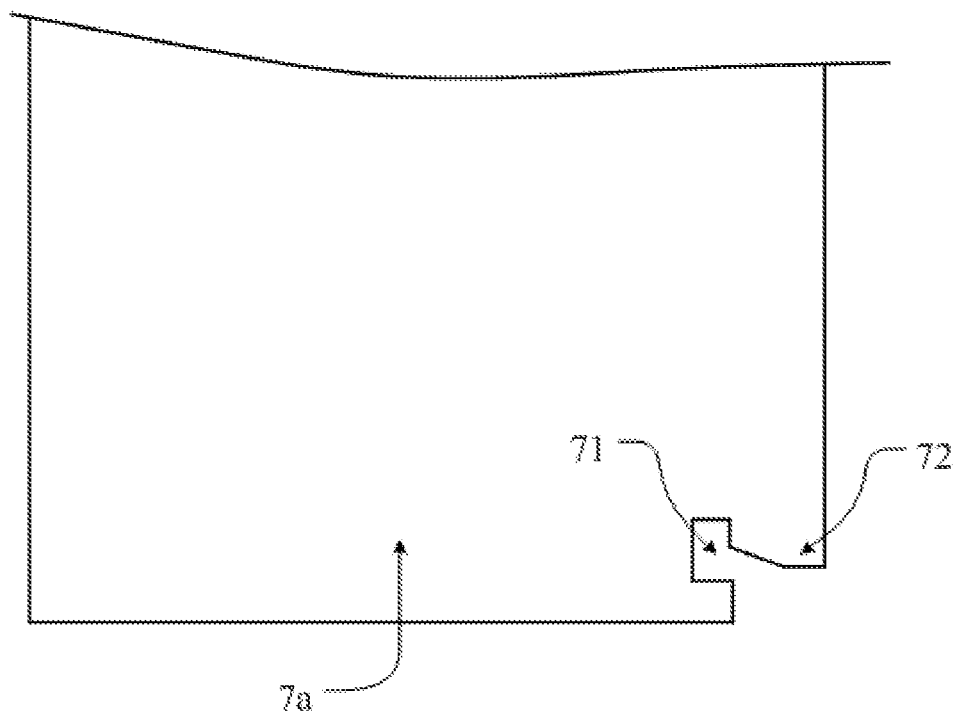
FIG. 6 is a schematic view showing the structure of a connecting component 7a according to the present application.

Referring to FIG. 6, the connecting component 7a is provided with the groove position 71 and the extending portion 72. The groove position 71 is configured to cooperate with the inclined protruding portion 111 of the locking piece 11, and the extending portion 72 is configured to cooperate with the front-end extending portion 21 of the locking tongue piece 2. After the inclined protruding portion 111 is retained into the groove position 71, the movement of the connecting component 7a in the vertical direction in FIG. 1 may be locked, and the front-end extending portion 21 of the locking tongue piece 2 may be pressed against the bottom of the extending portion 72, as shown in the partially enlarged view in FIG. 7.

Figure 7A:
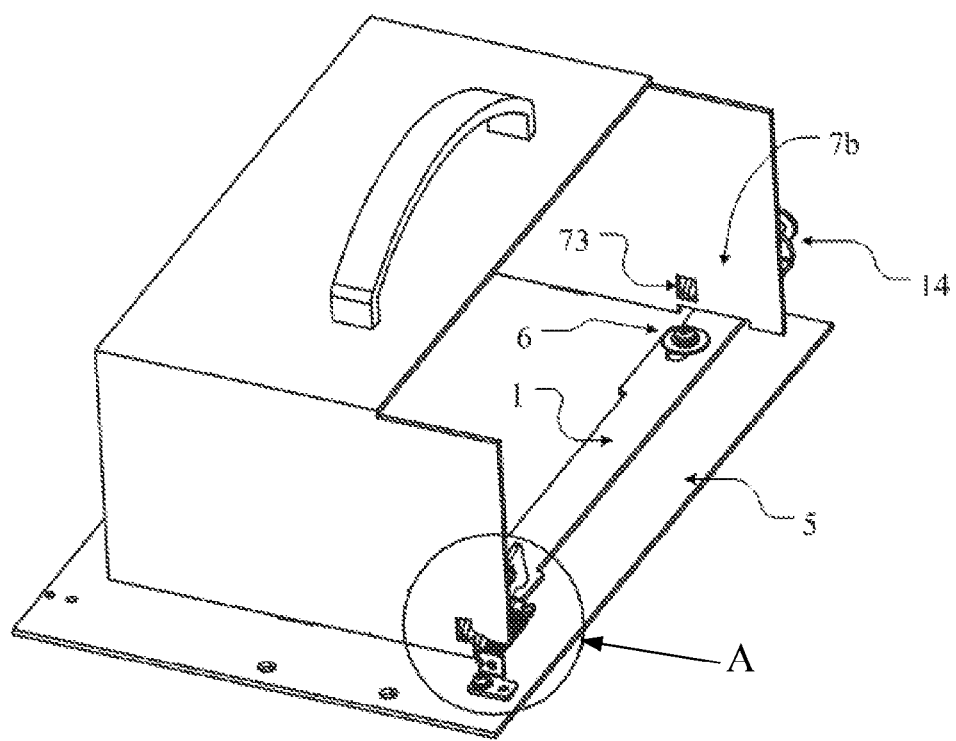
FIG. 7a is a schematic view showing the structure of the simple locking device according to the embodiment of the present application, with the movable device being locked to the simple locking device.
Figure 7B:
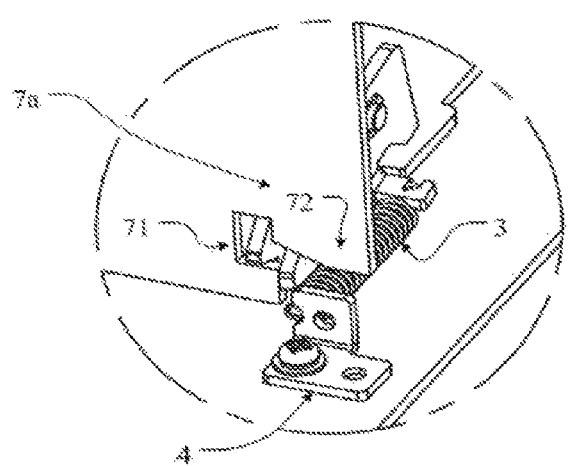

Referring to FIG. 7, the connecting component 7a and the connecting component 7b may be mounted to the same movable device, and/or, the connecting component 7a and the connecting component 7b may be arranged in the same movable device. In FIG. 7, the connecting component 7a is arranged at a left side of the movable device, and the connecting component 7b is arranged at a right side of the movable device. As illustrated in FIG. 7, the connecting component 7a and the connecting component 7b may be located on the movable device symmetrically according to the principle of structural mechanics.

The connection relationship between components of the simple locking device according to this embodiment is described as follows. The tension side wall 4 is fixed to the base 5.

Preferably, the two guide shafts 6 respectively pass through the two guide holes 12 to mount the locking bracket to the base 5, and the locking bracket 1 is guided by the guide holes 12 to move.

The tension spring 3 has one end fixed to the tension side wall 4, and another end fixedly connected to the locking bracket 1.

The locking tongue piece 2 is movably connected to the locking piece 11, and the locking tongue piece 2 is provided with a front-end extending portion 21, and the locking piece 11 is provided with an inclined protruding portion 111.

The connecting component 7b is provided with a retaining hole 73 configured to cooperate with the retaining piece 13.

Preferably, the retaining piece 13 is a wedge-shaped hook. The locking bracket 1 may be provided with several retaining pieces 13, and also, the connecting component 7b may be provided with several retaining holes 73 for cooperating with the several retaining pieces 13 respectively.

Preferably, the tension side wall 4 is welded to the base 5, or the tension side wall 4 is fixed to the base 5 by a bolt.

In the case that the front-end extending portion 21 of the locking tongue piece 2 abuts against a side surface of the extending portion 72 of the connecting component 7a, the tension spring 3 is in a tensioned state, and the locking bracket is guided by the guide holes 12 to move by a certain distance in a direction away from the tension side wall 4, the inclined protruding portion 111 of the locking piece 11 is disengaged from the groove position 71 of the connecting component 7a, and the retaining piece 13 is disengaged from the retaining hole 73 of the connecting component 7b.

The working process of an embodiment of the simple locking device is described in detail hereinafter.

The simple locking device has three working states, including an initial state, a locked state, and an unlocked state.

Figure 8A:
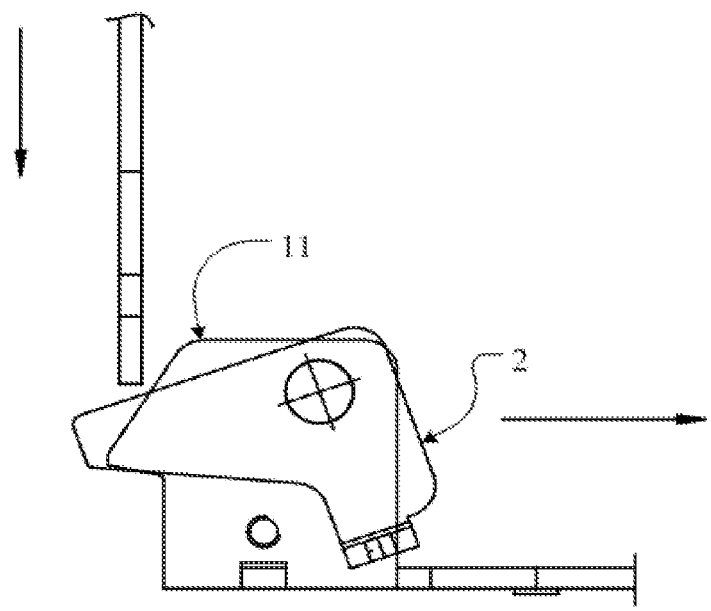
FIG. 8a shows the simple locking device in the initial state.

In the initial state, referring to FIG. 8a, the movable device is not laid down, at this time, the tension spring 3 is in an initial state (the tension spring 3 may be in a loose state, and may also be tensioned to a certain extent), and at this time, the locking bracket 1 is at a leftmost end in a movable range under the position-limiting effect of the guide holes 12, and each of the guide shafts 6 is at a rightmost position in the respective guide hole 12.

Figure 8B:
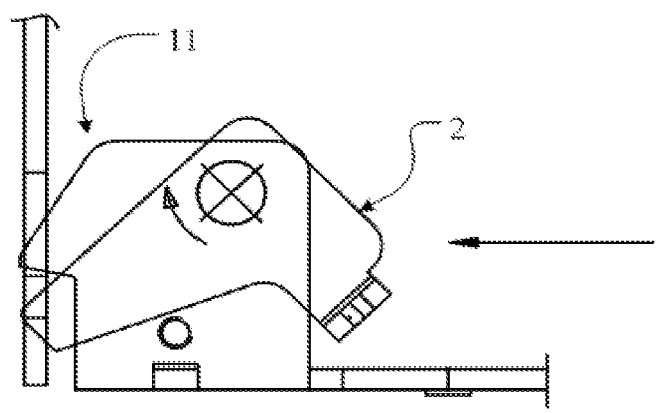
FIG. 8b shows the simple locking device in the locked state.

In the locked state, referring to FIG. 8b, the movable device has been locked by the simple locking device, the inclined protruding portion 111 of the locking piece 11 is clamped into the groove position 71 of the connecting component 7a at the left side of the movable device, and the front-end extending portion 21 of the locking tongue piece 2 is pressed against the bottom of the extending portion 72 of the connecting component 7a, the tension spring 3 is in a tensioned state (a force accumulating state), and the locking bracket 1 moves rightward by a certain distance under the position-limiting effect of the guide holes 12, and each of the guide shafts 6 is at a position, close to the left end of the respective guide hole 12, in the respective guide hole 12 (each of the guide shafts 6 may be at a leftmost end of the respective guide hole 12, and may also be spaced from the leftmost end of the respective guide hole 12 by a certain distance). The retaining piece 13 is clamped in the retaining hole 73 of the connecting component 7b at the right side of the movable device.

Figure 8C:
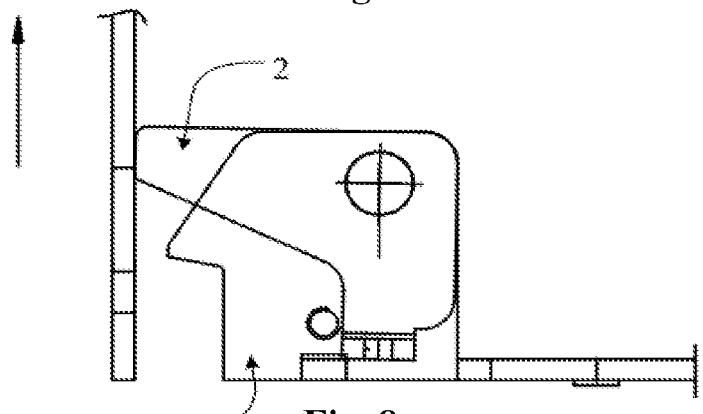
FIG. 8c shows the simple locking device in the unlocked state.

In the unlocked state, referring to FIG. 8c, the front-end extending portion 21 of the locking tongue piece 2 abuts against the side surface of the connecting component 7a, and the locking tongue piece 2 rotates upwards by a certain angle, and the tension spring 3 is in a tensioned state, the inclined protruding portion 111 of the locking piece 11 is disengaged from the groove position 71 of the connecting component 7a, and the retaining piece 13 is also disengaged from the retaining hole 73 of the connecting component 7b. The movable device is in an unlocked state in the vertical direction, and may be drawn out in the vertical direction.

In the process of switching from the initial state to the locked state, referring to FIG. 8, in the case that the movable device is laid down, the extending portion 72 of the connecting component 7a presses the front-end extending portion 21 of the locking tongue piece 2 downwards, and the connecting component 7a presses an upper portion of the inclined protruding portion 111 of the locking piece 11 downwards, and the connecting component 7b presses an upper portion of the retaining piece 13 downwards, to allow each of the locking tongue piece 2, the locking bracket 1 and the retaining piece 13 to overcome the tensioning force of the tension spring 3 to generate an action force for moving rightwards. The locking bracket 1 is guided by the guide holes 12 to move rightward by a certain distance, at this time, the groove position 71 of the connecting component 7a is just disposed down to the position corresponding to the inclined protruding portion 111, and the retaining hole 73 of the connecting component 7b is just disposed down to a clamping position for engaging with the retaining piece 13. At this time, under the effect of the tensioning force (the restoring force) of the tension spring 3, the locking bracket 1 moves back leftward by a small distance, to allow the inclined protruding portion 111 to be clamped into the groove position 71, and allow the retaining piece 13 to be clamped into the retaining hole 73 of the connecting component 7b. The front-end extending portion 21 of the locking tongue piece 2 continues to be pressed downwards by the extending portion 72 of the connecting component 7a, till the movable device is thoroughly locked into the simple locking device, and at this time, the simple locking device enters into the locked state.

In the process of switching from the locked state to the unlocked state, referring to FIG. 8, if the movable device is required to be drawn out, the handle position 14 is pulled slightly, and the locking bracket 1 moves rightward by a certain distance under the action of the pulling force, and at this time, the locking tongue piece 2 is turned upward by a certain angle about the pin shaft 8 under the pulling force of the tension spring 3 (the angle may be determined by a preset structure of the locking tongue piece 2), and the inclined protruding portion 111 is disengaged from the groove position 71 of the connecting component 7a, and the retaining piece 13 is disengaged from the retaining hole 73. After the handle position 14 is released, the locking bracket 1 moves leftward under the action of the restoring force of the tension spring 3, however at this time, the front-end extending portion 21 of the locking tongue piece 2 just abuts against the side surface of the extending portion 72 of the connecting component 7a, and the side surface of the extending portion 72 supports the locking tongue piece 2 and the locking bracket 1, and restricts the locking bracket 1 from moving leftward, and restricts the inclined protruding portion 111 from being clamped into the groove position 71, and restricts the retaining piece 13 from being retained into the retaining hole 73 again, thereby achieving the functions of unlocking and re-position-limiting and re-positioning of the simple locking device. The simple locking device enters into the unlocked state.

In the process of switching from the unlocked state to the initial state, referring to FIG. 8, the movable device is drawn out in the vertical direction. In the process of drawing out the movable device, the locking tongue piece 2 is no longer supported by the side surface of the extending portion 72 of the connecting component 7a, thus the locking tongue piece 2 and the locking bracket 1 move leftward under the effect of the tensioning force of the tension spring 3, till the simple locking device is recovered to the initial state.

In this embodiment, a simple locking device includes a locking bracket 1, a locking tongue piece 2, a tension spring 3, a tension side wall 4, a base 5, at least two guide shafts 6, and a connecting component 7a and a connecting component 7b. The locking bracket 1 includes a locking piece 11, at least two guide holes 12 and a retaining piece 13. The tension side wall 4 is fixed to the base 5. The at least two guide shafts 6 respectively pass through the at least two guide holes 12, to mount the locking bracket to the base 5, and the movement of the locking bracket 1 is guided by the guide holes 12. The tension spring 3 has one end fixed to the tension side wall 4, and another end fixedly connect to the locking tongue piece 2. The locking tongue piece 2 is movably connected to the locking piece 11. The locking tongue piece 2 is provided with a front-end extending portion 21 at its front end, the locking piece 11 is provided with an inclined protruding portion 111, and the connecting component 7a is provided with a groove position 71 configured to cooperate with the inclined protruding portion 111 of the locking piece 11, and an extending portion 72 configured to cooperate with the front-end extending portion 21 of the locking tongue piece 2. The connecting component 7b is provided with a retaining hole 73 configured to cooperate with the retaining piece 13. In this embodiment, the locking bracket 1, the locking tongue piece 2, the tension spring 3, the tension side wall 4, the base 5, the at least two guide shafts 6, the connecting component 7a and the connecting component 7b constitute a locking mechanism, which may perform actions in multiple states by a single mechanism, and no longer just performs the mechanical unlocking and locking by a single action, but can lock the movable device connected to the connecting components 7a and 7b in different states, thus, the operation becomes easier and more convenient, and the improvement of the user experience is facilitated. Moreover, the arrangement of the several retaining pieces 13 may further improve the stability of the movable device after being locked. With the handle position 14, the locking bracket 1 may be pulled by a slight action, which facilitates using the locking mechanism. The guide shafts 6 are embodied as bolts and the tension side wall 4 is fixed by screws, thus it is easy to disassemble and maintain the simple locking device, and it is also easy to replace the parts.

The person skilled in the art may clearly know that, for convenience and brevity of the description, the specific working process of the system, device, and unit described above may refer to the corresponding process in the embodiment of the method described above, which are not described herein further.

In the several embodiments provided by the present application, it should be appreciated that, the system, the device and the method disclosed herein may be implemented in other manners. For example, the embodiments of the device described above are only schematic. For example, the division of the units is only a division on logical function, and there may be other division modes in the practical implementation, for instance, multiple units or components may be combined, or may be integrated into another system; and some features may be omitted or unperformed. In addition, the coupling, direct coupling or communication connection between the components displayed or discussed above may be realized by some interfaces. The indirect coupling or communication connection between the devices or units may be electrical, mechanical or other forms.

The above unit described as a separate component may be or may be not separated physically. The component displayed as a unit may be or may be not a physical unit, that is, may be located at one place or may be distributed on multiple network units. The object of the solution of the embodiment may be achieved by selecting a part or all of the units according to the practical needs.

Furthermore, various function units in the embodiments of the present application may be integrated in one processing unit; or, each of the function units may be a single physical presence; or two or more function units are integrated in one unit. The above integrated unit may be realized in a form of hardware or in a form of software function unit.

In the case that the integrated unit is implemented in the form of software functional unit and is sold or used as a separate product, it can also be stored in a computer readable storage medium. Based on such understanding, the essence or the part that contributes to the conventional technology of the technical solutions of the present application or a part or whole of the technical solutions may be expressed in the form of a software product. The computer software product is stored in a storage medium, and includes several instructions which enables a computer device (which may be a personal computer, a server, or a network device, and etc.) to execute all or part of the step of the method of each embodiment of the present application. The storage medium described above includes various medium capable of storing program codes, such as a USB mass storage device, a movable storage device, a Read-Only Memory (ROM), a Random Access Memory (RAM), a magnetic disc or an optical disc.

The above description and the above embodiments only intend to illustrate the technical solutions of the present application, and are not deemed to limit the present application. Though the present application has been described in detail with reference to the above embodiments, it should be understood by the person skilled in the art that, they may still make modifications to the technical solutions set forth in the various embodiments described above, or make equivalent substitution to partial of the technical features in the above embodiments; and all these modifications or substitutions do not make the essence of the respective technical solutions depart from the spirit and scope of the technical solutions of the embodiments of the present application.

The invention claimed is:

1. A simple locking device, comprising:
    a locking bracket, a locking tongue piece, a tension spring, a tension side wall, a base, at least two guide shafts, a first connecting component and a second connecting component; wherein,
    the locking bracket comprises a locking piece, at least two guide holes and a retaining piece;
    the tension side wall is fixed to the base;
    the at least two guide shafts respectively pass through the at least two guide holes to mount the locking bracket to the base, and the locking bracket is configured to be guided by the guide holes to move;
    the tension spring has one end fixed to the tension side wall, and another end fixedly connected to the locking tongue piece;
    the simple locking device further comprises a pin shaft, the locking tongue piece is rotatably connected to the locking piece via the pin shaft passing through the locking tongue piece and the locking piece, the locking tongue piece is provided with a front-end extending portion, and the locking piece is provided with an inclined protruding portion;
    the first connecting component is provided with a groove position configured to cooperate with the inclined protruding portion of the locking piece, and an extending portion configured to cooperate with the front-end extending portion of the locking tongue piece; and
    the second connecting component is provided with a retaining hole configured to cooperate with the retaining piece;
    wherein in the case that the inclined protruding portion of the locking piece is clamped into the groove position of the first connecting component, the extending portion of the first connecting component presses the front-end extending portion of the locking tongue piece downwards and abuts against the front-end extending portion of the locking tongue piece, and the retaining piece is retained into the retaining hole of the second connecting component; and
    wherein, in the case that the front-end extending portion of the locking tongue piece abuts against a side surface of the extending portion of the first connecting component, the tension spring is in a tensioned state, and the locking bracket is guided by the guide holes to move by a certain distance in a direction away from the tension side wall, and the inclined protruding portion of the locking piece is disengaged from the groove position of the first connecting component, and the retaining piece is disengaged from the retaining hole of the second connecting component.

2. The simple locking device according to claim 1, wherein the locking tongue piece further comprises a spring hooking position;
    the spring hooking position is arranged at a side surface of the locking tongue piece, and is fixedly connected to the tension spring;
    the locking bracket further comprises a handle position; and
    the handle position is arranged at an end of the locking bracket that is closer to the retaining piece than to the locking piece, and is configured to provide a force applying point for pulling the locking bracket.

3. The simple locking device according to claim 2, wherein,
    the guide shafts are bolts;
    or,
    the guide shafts are protruding shafts arranged on the base.

4. The simple locking device according to claim 2, wherein
    the tension side wall is welded to the base;
    or,
    the tension side wall is fixed to the base by a bolt.

5. The simple locking device according to claim 1, wherein
    the first connecting component and the second connecting component are configured to be mounted to a same movable device;
    and/or,
    the first connecting component and the second connecting component are configured to be arranged on a same movable device.

6. The simple locking device according to claim 5, wherein
    the first connecting component and the second connecting component are respectively configured to be located on the movable device symmetrically.

7. The simple locking device according to claim 5, wherein,
    the guide shafts are bolts;
    or,
    the guide shafts are protruding shafts arranged on the base.

8. The simple locking device according to claim 5, wherein
    the tension side wall is welded to the base;
    or,
    the tension side wall is fixed to the base by a bolt.

9. The simple locking device according to claim 1, wherein
    the guide holes have the same guide directions.

10. The simple locking device according to claim 1, wherein, the guide shafts are bolts;

or, the guide shafts are protruding shafts arranged on the base.

11. The simple locking device according to claim 1, wherein the tension side wall is welded to the base;

or, the tension side wall is fixed to the base by a bolt.

* * * * *